Figure 1A:
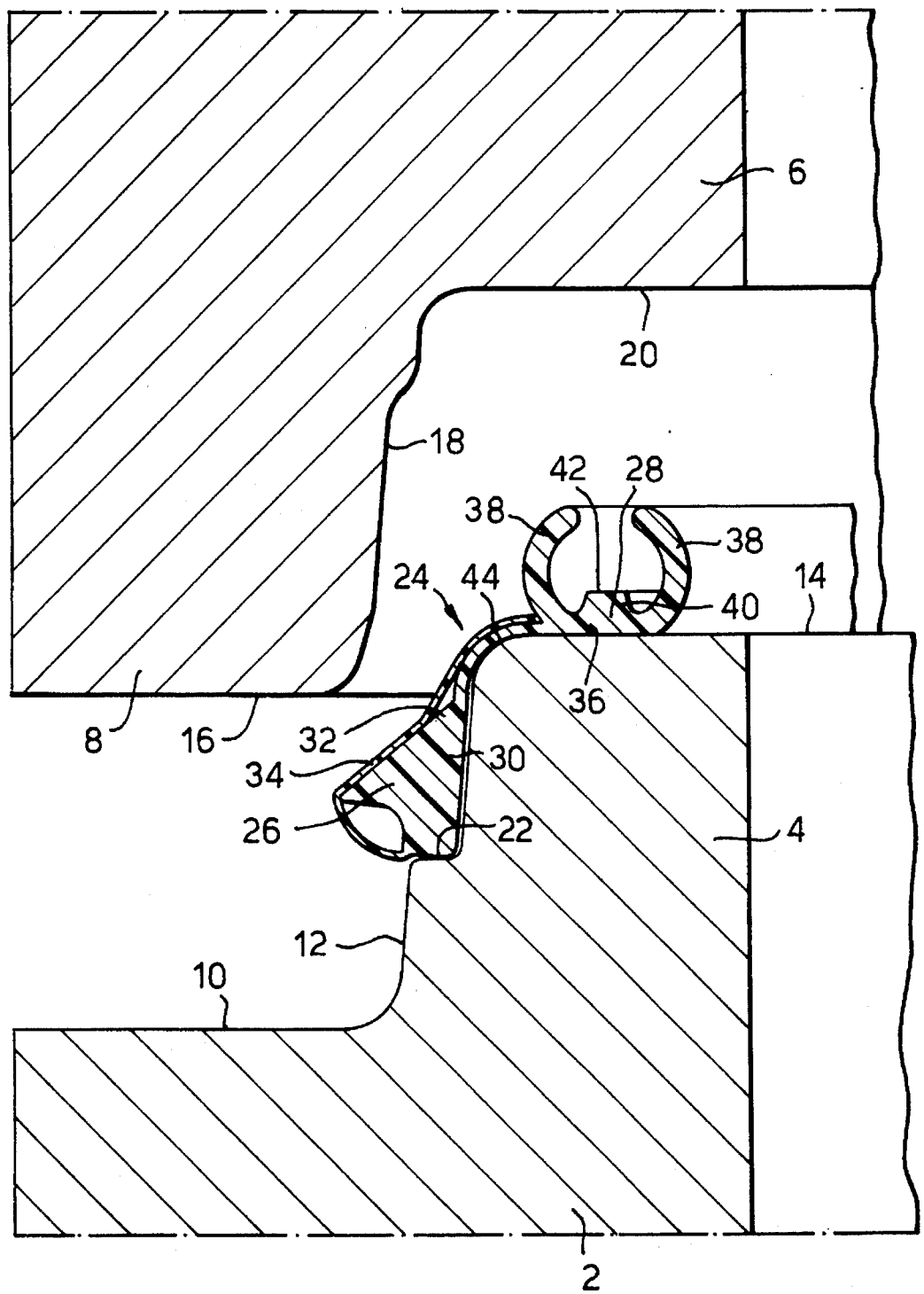

United States Patent [19]
Neumann et al.

[11] Patent Number: 5,507,504
[45] Date of Patent: Apr. 16, 1996

[54] SEALING DEVICE WITH C-SHAPED LIPS AND CENTRAL PROJECTION

[75] Inventors: Wieland Neumann, Mönchengladbach; Helmut Mehl, Weilburg, both of Germany; Anders Ström, Värnamo; Joakim Andersson, Anderstorp, both of Sweden

[73] Assignee: Forsheda AB, Forsheda, Sweden

[21] Appl. No.: 377,397

[22] Filed: Jan. 24, 1995

[30] Foreign Application Priority Data

Jan. 27, 1994 [SE] Sweden ................................ 9400302-7

[51] Int. Cl.[6] ................................................ F16J 15/10
[52] U.S. Cl. ...................... 277/207 A; 285/230; 285/231
[58] Field of Search ............................... 277/180, 207 A, 277/205, 206 A; 285/111, 230, 231, 910

[56] References Cited

U.S. PATENT DOCUMENTS 1,940,579 12/1933 Burtnett .
2,882,073 4/1959 James .
2,982,569 5/1961 Miller et al. ............................. 285/230
4,946,175 8/1990 Nordin et al. ....................... 277/207 A

FOREIGN PATENT DOCUMENTS

| 543103 | 5/1993 | European Pat. Off. ............... 285/230 |
| 754300 | 11/1933 | France . |
| 2672372 | 8/1992 | France .................................... 285/231 |
| 4132227 | 4/1993 | Germany ............................... 277/205 |
| 321378 | 8/1936 | Italy .................................. 277/207 A |
| 261168 | 11/1926 | United Kingdom . |
| 1342736 | 1/1974 | United Kingdom ................... 285/230 |

Primary Examiner—Scott W. Cummings
Attorney, Agent, or Firm—Baker & Daniels

[57] ABSTRACT

A sealing device for a sealing space defined by sealing surfaces of two elements (2, 6), preferably pipes or well rings consisting of concrete, comprises a sealing element (28). The sealing element is adapted to seal a section of the sealing space extending transversely of the jointing direction of the two elements and has prior to the jointing of the elements a substantially C-shaped cross section.

22 Claims, 5 Drawing Sheets

# SEALING DEVICE WITH C-SHAPED LIPS AND CENTRAL PROJECTION

The present invention relates to a sealing device for a sealing space between sealing surfaces of two elements, preferably two pipes or well rings consisting of concrete, the sealing space being established in jointing the two elements by introducing one of the elements into the other.

Sealing spaces of the kind having a central section parallel with the jointing direction of the elements and two sections extending transversely of the jointing direction and extending from one end each of the central section of the sealing space to opposite sides of the elements are established when connecting well rings or other pipe shaped elements of the kind having a socket and a spigot end. A sealing space of this kind is usually sealed by means of a sealing portion positioned in the section of the sealing space, which is parallel with the jointing direction of the elements. Thereby it is previously known to close at least one of the sections of the sealing space, extending transversely of the jointing direction to the walls of the two elements by means of a sealing element positioned in said section of the sealing space so as to prevent that the section of the sealing portion positioned outside the sealing portion is filled with dirt, bacteria and/or other materials which can damage the sealing portion.

Previously known sealing elements of the kind in question are not quite satisfactory with regard to their function and/or manufacturing and the object of the invention is to provide a device of the kind in question having a sealing element lacking the drawbacks of previously known sealing elements of said kind.

In order to comply with this object the device according to the invention is characterized in that the sealing element prior to the jointing of the two elements with each other has substantially C-shaped cross section having a central portion adapted at its outer surface to engage one of the sealing surfaces of said section of the sealing space extending transversely of the jointing direction and having two sealing lips extending from the central portion and having their free edges directed towards each other, said sealing lips being adapted to engage the opposite sealing surface of said transversely extending section of the sealing space and to be folded inwardly towards the central portion of the sealing element when the two elements are jointed by being introduced one into the other.

Preferably the central portion of the sealing element has at its inner surface a bead-shaped projection adapted to engage either the opposite sealing surface or the end portions of the sealing lips dependent on the position established by the sealing lips in the space. In a preferred embodiment of the device according to the invention the bead-shaped projection has a substantially flat, upper surface and the distance between the edges of the sealing lips is substantially the same as or somewhat larger than the width of said surface.

Preferably the device according to the invention comprises a sealing portion positioned in the central section of the sealing space, parallel with the jointing direction of the elements, and this sealing portion is thereby connected with the sealing element having a C-shaped section by means of a thin skin.

In the case that the sealing space is established between a socket and a spigot end of two pipes or well rings the sealing portion and the sealing element connected therewith are tensioned onto the spigot end of one of the pipes or one of the well rings.

When the sealing space is established between a socket and a spigot end of two pipes or well rings it is suitable that the central section of the sealing space which is parallel with the jointing direction of the pipes or well rings has two subsections, the first subsection having a larger transverse width than the second subsection. The sealing element is positioned in the larger first subsection and has width and having a displaceable portion which is preferably constituted by a sliding skin which is displaced into the second smaller subsection when the pipes or the well rings are jointed by being introduced one into the other.

The invention shall be described in the following with reference to the accompanying drawings.

FIG. 1*a* is a section of a device according to the invention prior to the establishment of a sealing space between two well rings.

Figure 1B:
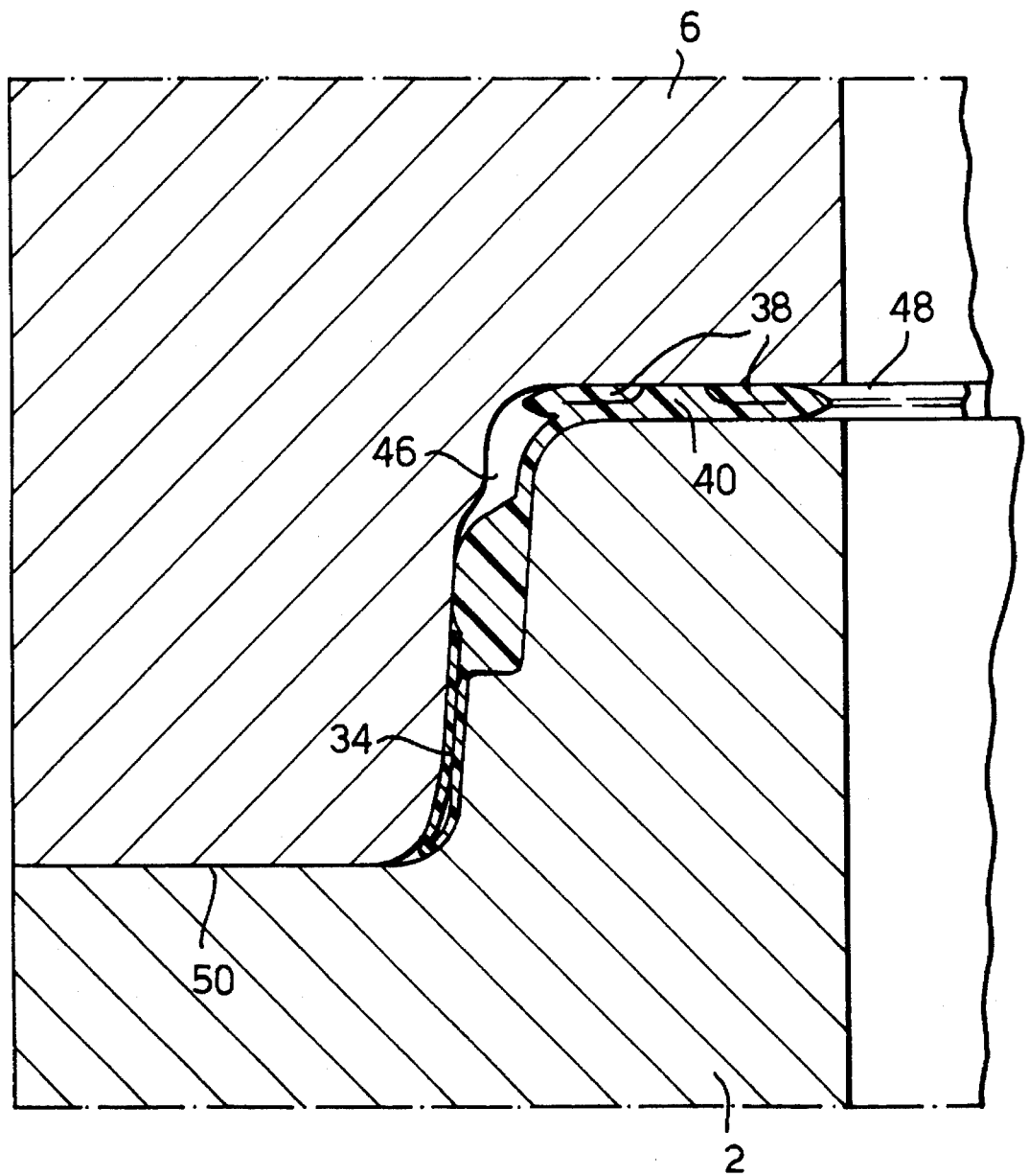

FIG. 1*b* is a section corresponding to FIG. 1*a* after the establishment of the sealing space, a sealing element included in the device according to the invention being shown in a first position.

Figure 1C:
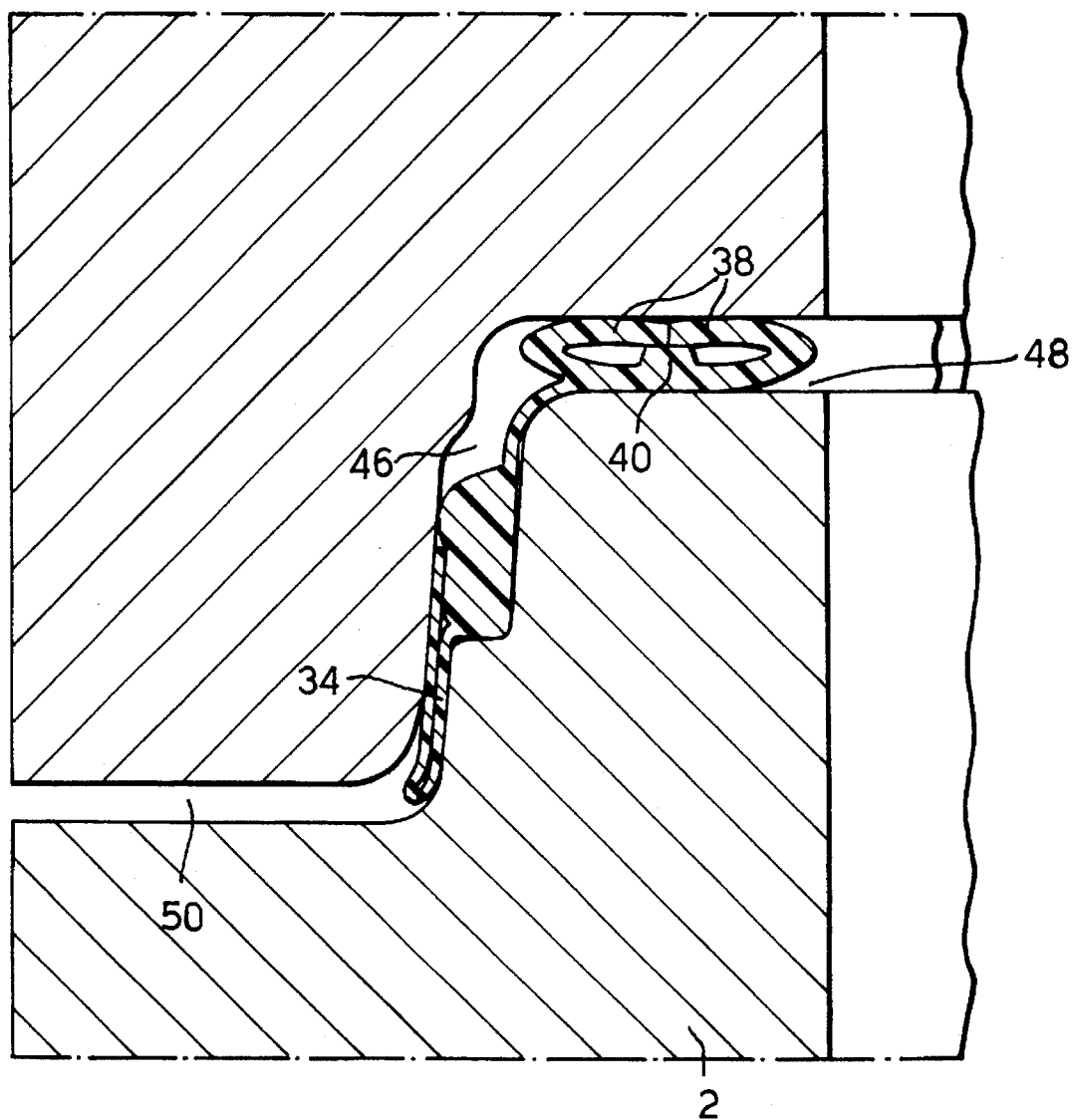

FIG. 1*c* is a section corresponding to FIG. 1*b* showing a second position of said sealing element.

Figure 2A:
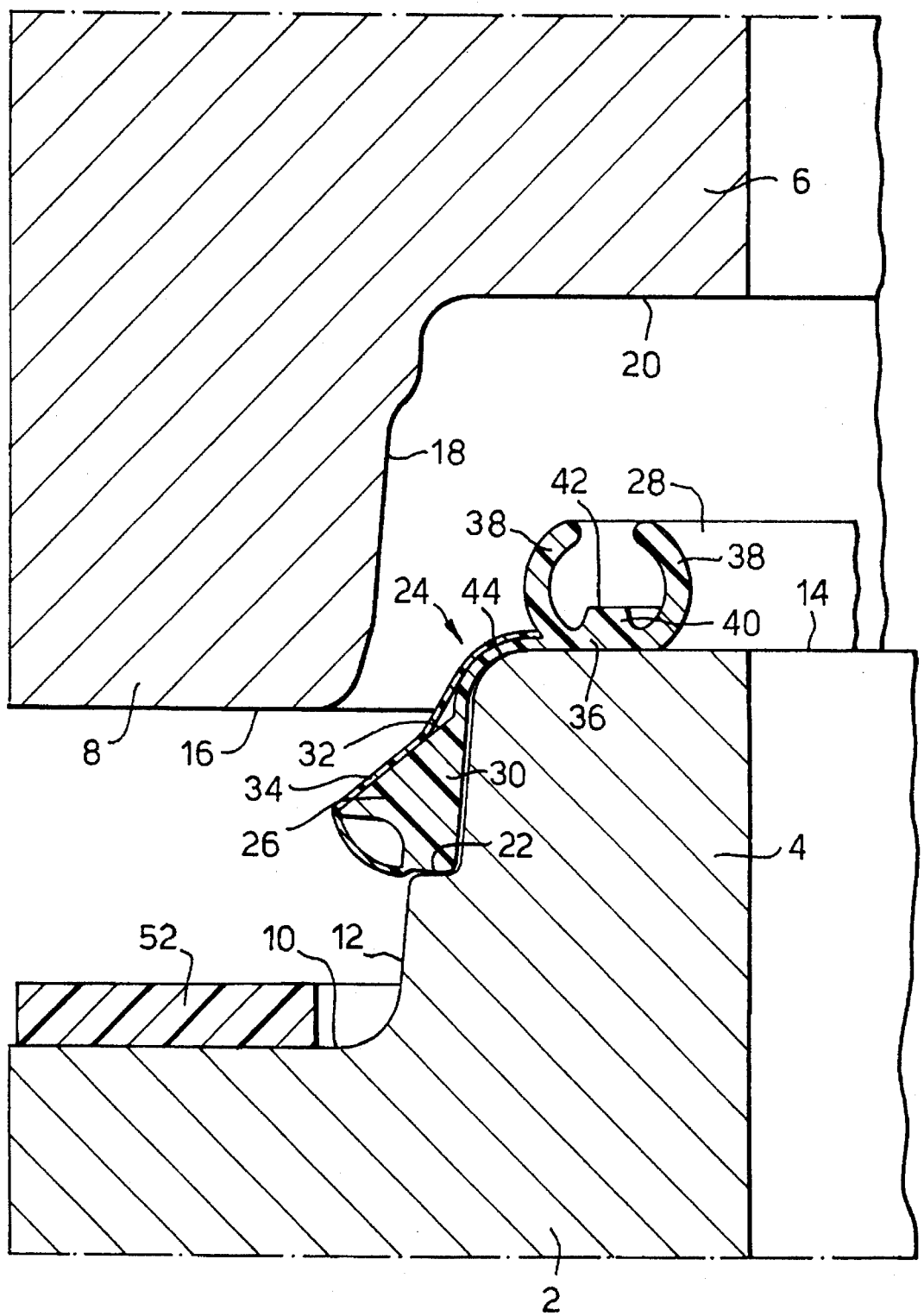

FIG. 2*a* is a section corresponding to FIG. 1*a* of a modified embodiment of the device according to the invention prior to the connection of the well rings with each other.

Figure 2B:
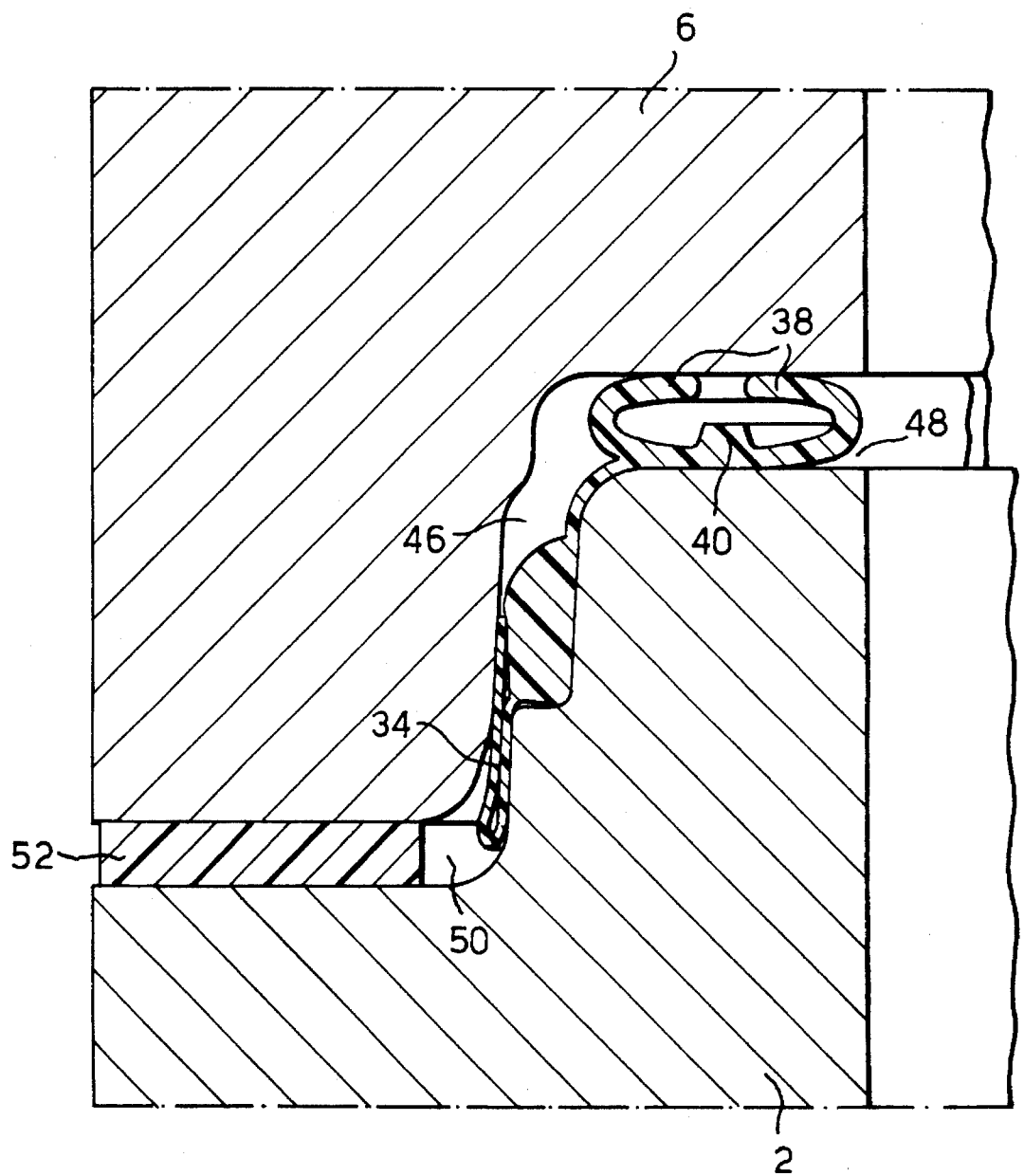

FIG. 2*b* a section of the device according to FIG. 2*a* after the well rings have been connected with each other for establishing the sealing space.

In FIG. 1*a* there is shown an axial section of the walls of two well rings, a lower well ring 2 having a spigot end 4 and an upper well ring 6 having a socket 8. The spigot end 4 forms a sealing surface consisting of an annular portion 10, a substantially cylindrical portion 12, and an annular portion 14. In a corresponding manner the socket 8 forms a sealing surface consisting of an annular portion 16, a cylindrical portion 18 and an annular portion 20. The annular portion 12 of the spigot end 4 has a shoulder 22.

On the sealing surface of the spigot end 4 there is positioned a sealing device 24 in a tensioned state consisting of a sealing portion 26 and a sealing element 28. The sealing element 26 has a sealing body 30 engaging the shoulder 22 and forming an outer conical sliding surface 32. The sealing element 26 further comprises a sliding skin 34 extending from a point of connection at the lower portion of the sealing body 30 upwardly over the sealing body in close connection with the conical surface 32.

The sealing element 28 has a substantially C-shaped axial section comprising a central portion 36 and two sealing lips 38 extending from the central portion 36 and directed towards each other at their free edges. The central portion 36 of the sealing element 28 has at its inner surface a bead-shaped projection 40 having a flat upper surface 42. The distance between the edges of the sealing lips 38 is the same as or somewhat larger than the width of the flat surface 42 of the bead-shaped projection 40.

The sealing element 28 is positioned on the annular portion 14 of the sealing surface and engages the sealing surface with the outer surface of the central portion 36.

The sealing portion 26 and the sealing element 28 are connected with each other by means of a thin skin 44.

When jointing the well rings 2 and 6 by lowering the socket 8 over the spigot end 4 the sealing surfaces define a sealing space consisting of a central section 46 which is substantially parallel with the jointing direction and is defined by the portions 12 and 18 of the sealing surfaces, and two sections 48 and 50 extending transversely of the jointing direction and extending from one end each of the central section of the sealing space to opposite sides of the elements and which are defined by the portions 14 and 20, and 10 and 16, respectively, of the sealing surfaces.

When connecting the well rings with each other for establishing the sealing space the portion 18 of the sealing surface of the socket 8 engages the sliding skin 34 which is thereby displaced to the lower, narrower portion of the section 46 of the sealing space, which is parallel with the jointing direction at the same time as the sealing body 30 is subjected to a compression. During the connection or jointing operation the portion 20 of the sealing surface of the socket 8 is displaced towards the sealing lips 38 of the sealing element 28, which are thereby folded and either take the position shown in FIG. 1b with the edges of the sealing lips positioned at opposite sides of the bead-shaped projection 40 or take the position shown in FIG. 1c with the edge portions of the sealing lips 38 positioned between the flat surface 42 of the bead-shaped projection 40 and the portion 20 of the sealing surface of the socket 8. In the position of the sealing lips as shown in FIG. 1b the section 50 of the sealing space is substantially completely closed while said section of the sealing space will be wider with the portions 10 and 16 of the sealing surfaces at some distance from each other when the sealing lips 38 take the position shown in FIG. 1c. After the introduction of the spigot end 4 into the socket 8 the sliding skin 34 takes a position in the smaller portion of the section 46 of the sealing space for constituting a support preventing lateral displacement of the socket 8 in relation to the spigot end 4. Such lateral displacement can jeopardize the function of the sealing portion 24 by the fact that the section 46 of the sealing space will be too large or too small. In the embodiment of the invention shown in FIGS. 2a and 2b there is between the portion 10 of the sealing surface of the spigot end and the portion 16 of the sealing surface of the socket 8 positioned an annular spacing element 52 of elastic material. The spacing element 52 can also be designed as several portions which are separate from each other. The spacing element 52 is adapted to prevent such engagement between the portions 10 and 16 of the sealing surfaces of the spigot end 4 and the socket 8 which can provide damages in the concrete material during the jointing of the well rings and if these are on a later occasion subjected to stresses. In the embodiment according to FIGS. 2a and 2b the function of the sealing portion 26 and the sealing element 28 is substantially the same as in the embodiment according to FIGS. 1a, 1b and 1c. However, there is the difference that in the embodiment according to FIGS. 2a and 2b the sealing lips 38 are subjected to less deformation as the sealing element 28 is positioned in a wider space.

It appears that the sealing element 28 closes the sealing space between the well rings in direction towards the inner of the well and prevents the section of the sealing space positioned inside the sealing portion 26 from being filled with dirt and bacteria which may jeopardize the function of the sealing portion 26. The sealing element 28 can be designed so that it is visible at the inner surface of the well after the connection of the well rings which makes it possible to find out that the sealing spaces have been provided with their sealing devices. It appears that the sealing element 28 fulfills the requirements for an efficient sealing in different positions between the well rings. In addition thereto the sealing element is of a design facilitating the manufacturing of the sealing element.

We claim:

1. A sealing device for sealing a space between sealing surfaces located on cooperating stepped ends of first and second annular elements, the sealing space being established by jointing the ends of the first and second elements with each other, the sealing surfaces of the first and second elements defining the sealing space comprising a central section parallel with a jointing direction and a first and second transverse section extending transverse to the longitudinal axis and from opposite ends of the central section of the sealing space to opposite sides of the elements, the device comprising a sealing element for sealing the first transverse section of the sealing space, characterized in that the sealing element prior to the jointing of the elements has a substantially C-shaped cross section having a central portion adapted to engage at its outer surface one of the sealing surfaces of said first transverse section of the sealing space and having two sealing lips extending from the central portion and being directed towards each other at their free edges, the sealing lips being adapted to engage the opposite sealing surface of said first transverse section of the sealing space and to be folded towards the central portion of the sealing element when the two elements are being jointed.

2. A device as claimed in claim 1, wherein the central portion of the sealing element has at its inner surface a bead-shaped projection adapted to engage the opposite sealing surface when the sealing lips are in a first position and engage the end portions of the sealing lips when the sealing lips are in a second position 3. A device as claimed in claim 2, wherein the bead-shaped projection has a substantially flat, upper surface.

4. A device as claimed in claim 3, wherein when the sealing lips are not engaged by the opposite sealing surface the distance between the edges of the sealing lips is at least as large as a transverse width of the flat surface of the bead-shaped projection.

5. A device as claimed in claim 1, further comprising a sealing portion positioned in the central section of the sealing space and connected to the C-shaped sealing element.

6. A device as claimed in claim 5, wherein the sealing portion is connected to the C-shaped sealing element by means of a thin skin.

7. A device as claimed in claim 5, wherein the sealing space is established between a socket and a spigot end of the two elements, said elements comprising two pipes, and the sealing portion and the sealing element connected therewith are in a tensioned state positioned on the spigot end of one of the pipes.

8. A device as claimed in claim 5, wherein the central section of the sealing space has a first and second subsection with differing transverse widths, the second subsection having a smaller width, and the sealing portion is positioned in the first subsection and has a displaceable portion which is displaced into the second subsection by the joining of the two elements 9. A device as claimed in claim 8, wherein the displaceable portion of the sealing portion is constituted by a sliding skin.

10. A device as claimed in claim 1, further comprising a spacing element positioned in the second transverse section of the sealing space.

11. A device as claimed in claim 2, further comprising a sealing portion positioned in the central section of the sealing space and connected to the C-shaped sealing element.

12. A device as claimed in claim 3, further comprising a sealing portion positioned in the central section of the sealing space and connected to the C-shaped sealing element.

13. A device as claimed in claim 4, further comprising a sealing portion positioned in the central section of the sealing space and connected to the C-shaped sealing element.

14. A device as claimed in claim 6, wherein the sealing space is established between a socket and a spigot end of the two elements, said elements comprising two pipes, and the sealing portion and the sealing element connected therewith are in a tensioned state positioned on the spigot end of one of the pipes.

15. A device as claimed in claim 6, wherein the central section of the sealing space has a first and second subsection with differing transverse widths, the second subsection having a smaller width, and the sealing portion is positioned in the first subsection and has a displaceable portion which is displaced into the second subsection by the joining of the two elements.

16. A device as claimed in claim 7, wherein the central section of the sealing space has a first and second subsection with differing transverse widths, the second subsection having a smaller width, and the sealing portion is positioned in the first subsection and has a displaceable portion which is displaced into the second subsection by the joining of the two elements 17. A device as claimed in claim 2, further comprising a spacing element positioned in the second transverse section of the sealing space.

18. A device as claimed in claim 3, further comprising a spacing element positioned in the second transverse section of the sealing space.

19. A device as claimed in claim 4, further comprising a spacing element positioned in the second transverse section of the sealing space.

20. A device as claimed in claim 5, further comprising spacing element positioned in the second transverse section of the sealing space.

21. A device as claimed in claim 5, wherein the sealing space is established between a socket and a spigot end of the two elements, said elements comprising two well rings, and the sealing portion and the sealing element connected therewith are in a tensioned state positioned on the spigot end of one of the well rings.

22. A device as claimed in claim 6, wherein the sealing space is established between a socket and a spigot end of the two elements, said elements comprising two well rings, and the sealing portion and the sealing element connected therewith are in a tensioned state positioned on the spigot end of one of the well rings.

* * * * *